T. J. McCARTHY.
AUTOTRUCK.
APPLICATION FILED APR. 28, 1921.

1,419,067.  Patented June 6, 1922.

INVENTOR
Thomas McCarthy
by Hazard & Miller
ATTYS.

UNITED STATES PATENT OFFICE.

THOMAS J. McCARTHY, OF LAWNDALE, CALIFORNIA, ASSIGNOR TO AUTO LIFT AND CARRIER COMPANY, OF PHOENIX, ARIZONA, A CORPORATION OF ARIZONA.

AUTOTRUCK.

1,419,067. Specification of Letters Patent. Patented June 6, 1922.

Application filed April 28, 1921. Serial No. 465,082.

*To all whom it may concern:*

Be it known that I, THOMAS J. MC-CARTHY, a citizen of the United States, residing at Lawndale, in the county of Los Angeles and State of California, have invented new and useful Improvements in Autotrucks, of which the following is a specification.

This invention relates to trucks which are particularly adapted to be positioned beneath the various wheels of a motor vehicle so as to support the vehicle and permit the ready movement thereof from place to place, as in a garage, or repair shop.

More specifically the invention provides a truck structure having a runway arranged to receive a wheel of a vehicle, with the truck so constructed as to be tiltable in order to cause engagement between the end of the runway and the ground, and thereby permit of the wheel of the vehicle being run onto the truck. The parts are so arranged that when the wheel of a vehicle is on the truck, the weight will return the truck to normal position supporting the wheel as soon as the tilting mechanism is released.

The invention will be readily understood from the following description of the accompanying drawings, in which.

Figure 1:
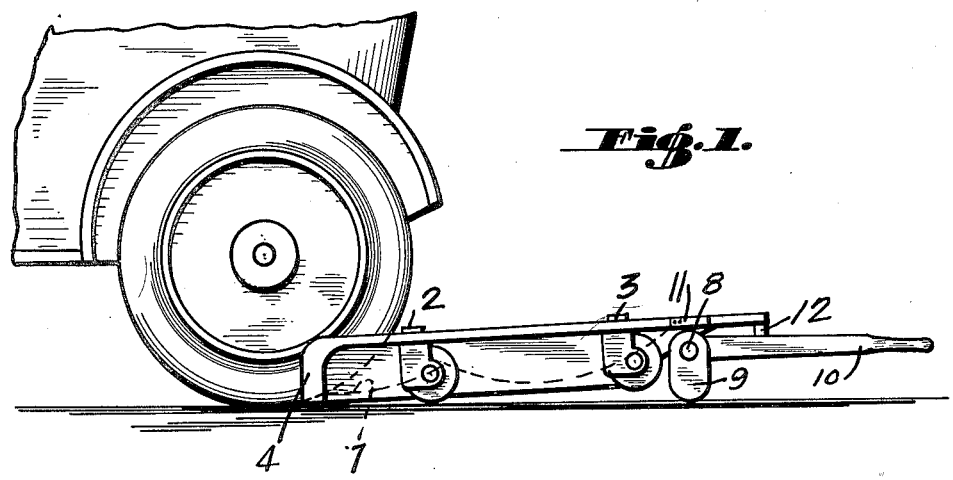
Figure 1 is a side elevation of a truck constructed in accordance with the invention, and showing the same in use and tilted so that a vehicle wheel may be run onto the same.

The improved truck includes a base member 1 preferably supported at points between the center of the truck and its respective ends by sets of casters 2 and 3, which include casters at the respective sides of the truck. The base member is preferably formed with side extensions 4 extending downwardly over the casters, and the front of the base is curved downwardly as shown at 5. A runway 6 is formed in the base structure extending lengthwise of the truck from its front end and medially of the same. This runway includes a front portion 7 which is inclined downwardly to the lower edge of the depending front portion 5 of the truck structure, and the rear end of the inclined portion of the runway is connected to the main portion of the runway which is preferably a longitudinally curved recess of a suitable size and shape as to receive the wheel of a motor vehicle or the like. This main portion of the runway is positioned between the sets of casters 2 and 3 in order that when a wheel is in the same, the weight of the vehicle supported by the truck will tend to place the truck in a normal horizontal position with all of its casters engaging the ground.

Figure 2:
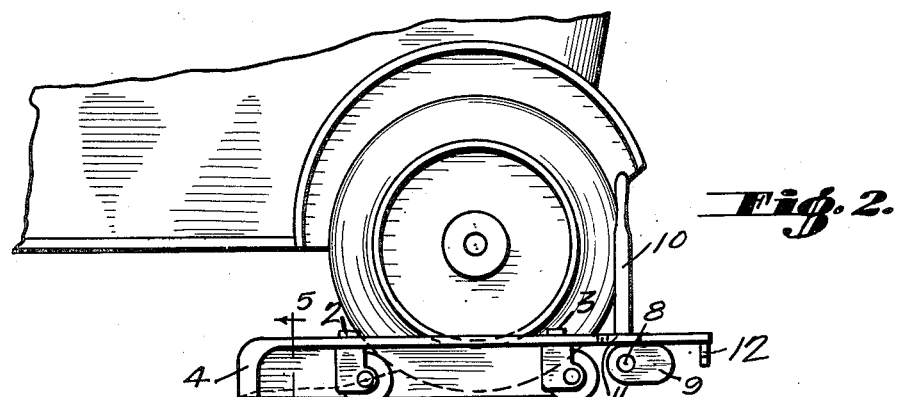
Fig. 2 is a similar view showing the wheel upon the truck and the latter returned to normal position for supporting the wheel.
Figures 3, 4:
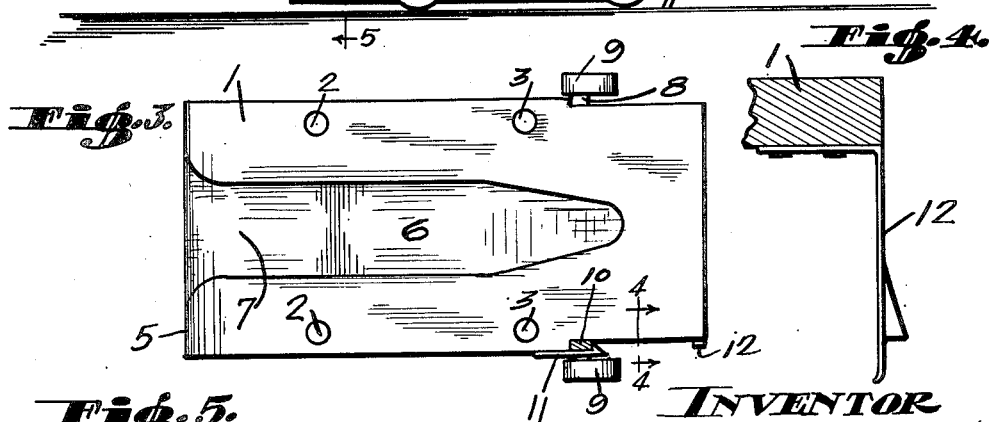
Fig. 3 is a plan view of a truck constructed in accordance with the invention.
Fig. 4 is a detail section on the line 4—4 of Fig. 3.
Figure 5:
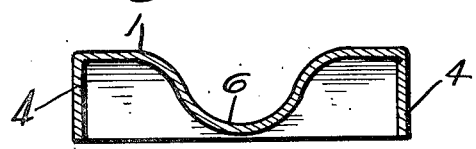
Fig. 5 is a transverse section on the line 5—5 of Fig. 2.

Means are provided at the rear end of the truck for tilting the same and thereby causing the forward end of the runway to engage the ground as shown in Fig. 1. For this purpose a shaft 8 extends transversely of the truck in rear of casters 3, and cams 9 are fixed upon said shaft, while a hand lever 10 projecting from the shaft is provided for rocking the latter. When the hand lever is swung upwardly, the cams 9 are also swung upwardly, as clearly shown in Fig. 2, while downward swinging of the hand lever to the position shown in Fig. 1 is adapted to swing the cams into engagement with the ground so as to elevate casters 3, and thereby depress the forward end of the truck until the end of the runway is in engagement with the ground so that a wheel of a vehicle may be readily run onto the truck.

The hand lever 10 is adapted to be secured in either of its positions, and for this purpose a spring catch 11 upon the side of the base of the truck is arranged to engage the hand lever when the latter is swung upwardly, while a spring catch 12 is provided at the side of the rear end of the truck for engaging the hand lever when it is swung downwardly.

It will be noted that the improved construction provides a truck which may be readily tilted so as to permit a wheel of a vehicle being run onto the same, and that when the vehicle wheel is upon the truck and the tilting mechanism is released, the weight of the vehicle will return the truck to its normal position supporting the vehicle wheel. With one of the trucks thus positioned beneath each wheel of a vehicle, the latter may be readily moved from place to place and thereby provide a convenient apparatus for use in garages and the like.

Various changes may be made without departing from the spirit of the invention as claimed.

It will be seen that when the cam lever 10 is thrown downwardly, its outer end will engage the floor or other surface, and with the cams 9 in engagement with the floor, and with the front portion 7 in engagement with the floor, there will be at least three points of contact or support for the device while the vehicle is rolled into position.

What is claimed is:

1. A truck having a runway adapted to receive a wheel of a vehicle, and a cam at one end of said truck adapted to be swung into ground engaging position for elevating the near end of said truck and to cause the opposite end of said runway to engage the ground.

2. A truck having a runway adapted to receive a wheel of a vehicle, a cam at one end of said truck adapted to be swung into ground engaging position for elevating the near end of said truck and to cause the opposite end of said runway to engage the ground, and means for retaining said cam in operative or inoperative position.

3. A dolly adapted to receive a wheel of a vehicle and having a body provided at one end with a downwardly inclined entrance runway, a set of wheels for supporting the dolly in a normal position with the entrance runway clear of the floor or other surface, and means for tilting up one end of the dolly to bring the entrance runway down to floor engaging position and consisting of a crank shaft provided with a cam roller and having an actuated hand lever provided with a part to engage the floor surface when the cam roller has been swung to the dolly elevating position, whereby the elevated dolly has at least three points of support along its length.

In testimony whereof I have signed my name to this specification.

THOMAS J. McCARTHY.